2,972,564
3-METHYL-3-PENTANOL CARBAMATE COMPOSITIONS HAVING MUSCLE RELAXING AND TRANQUILIZING ACTION

Bengt Olof Melander, Stockholm, and Gunnar Hanshoff, Sodertalge, Sweden, assignors to A/B Kabi, Stockholm, Sweden, a corporation of Sweden No Drawing. Filed Nov. 17, 1958, Ser. No. 774,091

Claims priority, application Sweden Nov. 23, 1957

4 Claims. (Cl. 167—65)

This invention relates to new therapeutic compositions having muscle relaxing and tranquilizing action. More particularly, the invention relates to certain lower alkyl substituted tertiary pentanol carbamate compounds having muscle relaxing and tranquilizing properties, and to the preparation of such compounds and formulation thereof as therapeutically useful compositions.

The active muscle relaxing and tranquilizing agents in accordance with the present invention can be identified as lower alkyl substituted tertiary pentanol carbamates of the formula:

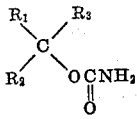

wherein $R_1$ and $R_2$ are alkyl substituents having a combined total of 4 carbon atoms and $R_3$ is a 1 to 2 carbon alkyl group. More specifically, the present invention and the foregoing formula embrace the active compounds:

3-methyl-3-pentanol carbamate
3-ethyl-3-pentanol carbamate, and
2-methyl-2-pentanol carbamate These compounds possess muscle relaxing properties and selective tranquilizing effects on the central nervous system. They are effective as skeletal relaxants, and are useful in the management of anxiety and tension states with a minimal incidence of undesirable side effects. These properties appear to be unique with the foregoing compounds, and are not found in even quite closely related carbamate compounds.

The compounds of this invention are active when administered orally, rectally or parenterally. They are only slightly soluble in water, however, and for therapeutic use, in order to ensure proper absorption and favorable therapeutic effect, they are preferably incorporated in suitable pharmaceutical carriers. In clinical use of these compounds the recommended dosage is 50 to 800 mgs., preferably 100 to 400 mg., of active drug 2 to 4 times per day. Thus in preparing tablets, capsules, elixirs, suppositories or other dosage forms with pharmaceutical carriers the formulation should preferably contain 100 to 400 mg. of active drug per dosage unit.

The active compounds can be prepared in various ways. One, presently preferred, procedure involves reacting a lower alkyl substituted tertiary pentanol of the formula

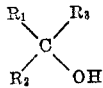

wherein $R_1$ and $R_2$ are alkyl substituents having a combined total of 4 carbon atoms and $R_3$ is a 1 to 2 carbon alkyl group, with an alkali metal cyanate under acidic conditions, as for example by heating to about 45–50° C. for about 24 hours, then neutralizing the reaction mixture with an alkaline carbonate, and recovering from the liquid fraction of the reaction mixture the corresponding lower alkyl substituted tertiary pentanol carbamate. Acidic conditions in the reaction can be obtained by the use of trichloroacetic acid, in which event the reaction mixture is preferably neutralized with an alkali metal carbonate. Purification of the product is preferably effected by extraction with and/or recrystallization from petroleum ether, cyclohexane, methanol-water or ethanol-water.

Another procedure which can be employed involves reacting a lower alkyl substituted tertiary pentanol of the above formula with carbamyl chloride with elimination of the hydrogen chloride formed during the process as for example by letting it escape from the reaction mixture or by adding an alkaline earth metal carbonate.

A generally related process involves the use of the corresponding unsaturated alcohols as starting materials, converting the same to the carbamate by reaction with alkali metal cyanate as above described, and then hydrogenating the unsaturated tertiary alcohol carbamate. Hydrogenation can suitably be effected in methanol solution in the presence of a hydrogenative catalyst such as platinum oxide catalyst at a temperature of about 20 to 40° C. and hydrogen pressure of about 1 kg./cm.$^2$.

Still another procedure which can be employed for preparing the active compounds is to react a lower alkyl substituted tertiary pentanol ester of the formula

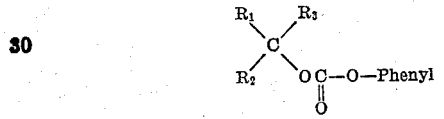

wherein $R_1$ and $R_2$ are alkyl substituents having a combined total of 4 carbon atoms and $R_3$ is a 1 to 2 carbon alkyl group, in ether solution with liquid ammonia in a closed system, during which the temperature may increase to about 20° C. and the pressure to about 7 kg./cm.$^2$. Excess ammonia is then evaporated and after extraction with dilute alkali and with water followed by drying, the ether solution is evaporated to recover the corresponding pentanol carbamate.

The following examples will show how the active compounds of the present invention can be prepared, as well as the preparation of typical orally and rectally administrable formulations of the active compounds, but it is to be understood that these examples are given by way of illustration and not of limitation.

Example I 30.5 g. of 3-methyl-3-pentanol, 8.1 g. of potassium cyanate and 16.3 g. of trichloroacetic acid are heated while stirring at 45–50° C. for 24 hours, neutralized by successive addition of anhydrous sodium carbonate. The precipitate is removed from the reaction mixture. Unreacted 3-methyl-3-pentanol is distilled off and the residue is added to a small volume of distilled water. After precipitation and filtration the resulting 3-methyl-3-pentanol carbamate is dried and recrystallized from petroleum ether. M.P. 54–55° C.

Example II

According to the method of Example I, 3-ethyl-3-pentanol and potassium cyanate are reacted to form 3-ethyl-3-pentanol carbamate with the M.P. 81–82° C.

Example III

According to the method of Example I, 2-methyl-2-pentanol and potassium cyanate are reacted to form 2-methyl-2-pentanol carbamate with the M.P. 58–59° C.

Example IV 10.2 g. of 3-methyl-3-pentanol in 50 ml. of dry ethyl ether are added dropwise to 8 g. of carbamyl chloride in 25 ml. of dry ethyl ether at 0° C. while stirring. The reaction mixture is left overnight, treated with distilled water, dried and evaporated to dryness. The residue is recrystallized from petroleum ether leaving 3-methyl-3-pentanol-carbamate with the M.P. 54–55° C.

Example V

According to the method of Example IV, 3-ethyl-3-pentanol and carbamyl chloride are reacted to form 3-ethyl-3-pentanol-carbamate with the M.P. 81–82° C.

Example VI

According to the method of Example IV, 2-methyl-2-pentanol and carbamyl chloride are reacted to form 2-methyl-2-pentanol-carbamate with the M.P. 58–59° C.

Example VII 8 g. of carbamyl chloride are added to a cooled mixture of 10.2 g. of 3-methyl-3-pentanol and 50 ml. of chloroform. To this solution are added subsequently 5 g. of dry calcium carbonate at such a rate that the temperature does not exceed 0° C. After stirring for 2 hours at room temperature the precipitate formed is filtered off, the chloroform solution treated with distilled water and dried over magnesium sulfate. The solvent is evaporated and the residue recrystallized from petroleum ether leaving 3-methyl-3-pentanol-carbamate with the M.P. 54–55° C.

Example VIII

According to the method of Example VII, 3-ethyl-3-pentanol and carbamyl chloride are reacted to form 3-ethyl-3-pentanol-carbamate with the M.P. 81–82° C.

Example IX

According to the method of Example VII, 2-methyl-2-pentanol and carbamyl chloride are reacted to form 2-methyl-2-pentanol carbamate with the M.P. 58–59° C.

Example X 10 g. of 3-methyl-3-penten-3-ol carbamate (prepared from the corresponding alcohol by the procedure as described in Example I) are dissolved in 100 ml. of methanol and subjected to hydrogenation in the presence of 0.2 g. of platinum oxide catalyst at a temperature of 20–40° C. and a hydrogen pressure of 1 kg./cm.$^2$. After completed reaction the catalyst is removed and the methanol is driven off. Upon recrystallization from petroleum ether resulting 3-methyl-3-pentanol carbamate has the M.P. 54–55° C.

Example XI

According to the method of Example X, hydrogenation of 3-methyl-3-penten-3-ol carbamate yields 3-methyl-3-pentanol carbamate with the M.P. 54–55° C.

Example XII 40 g. of (1-methyl-1-ethyl-propyl)-phenyl carbonate are dissolved in 100 ml. of ether to which 100 ml. of liquid ammonia are added. The reaction mixture is stirred in an autoclave for 4 hours. The temperature rises to +20° C. and the pressure to about 7 kg./cm.$^2$. After evaporation of the ammonia, the solution is extracted with 4% sodium hydroxide (twice with 150 ml.) and treated with 100 ml. of distilled water followed by drying over magnesium sulfate. The ether solution is evaporated and the residue recrystallized from petroleum ether. The 3-methyl-3-pentanol-carbamate formed has the M.P. 54–55° C.

Example XIII

According to the method of Example XII, (1,1-diethyl-propyl)-phenyl carbonate and ammonia are reacted to form 3-ethyl-3-pentanol-carbamate with the M.P. 81–82° C.

Example XIV

According to the method of Example XII, (1,1-dimethyl-butyl)-phenyl carbonate and ammonia are reacted to form 2-methyl-2-pentanol-carbamate with the M.P. 58–59° C.

Example XV.—Tablets

A granulation is prepared of

| | |
|---|---|
| Lactose | parts__ 74 |
| Starch | do____ 26 |
| Water | A sufficient quantity |

The granulation is dried and screened.

| | G. |
|---|---|
| 3-methyl-3-pentanol-carbamate | 100 |
| Lactose granulation | 145 |
| Magnesium stearate | 5 | are mixed well together and compressed into tablets weighing 250 mg. (diameter 9 mm.) and containing 100 mg. of the carbamate.

Example XVI.—Coated tablets

A paste is prepared of

| | Kg. |
|---|---|
| Starch | 1 |
| Water | 5 |

A mixture of

| | Kg. |
|---|---|
| 3-methyl-3-pentanol-carbamate | 20 |
| Lactose | 14 |
| Starch | 4 | is granulated with the starch paste, dried, screened and mixed with 1 kg. of magnesium stearate.

The granulation is compressed into tablets weighing 400 mg. (concave punch, diameter 11 mm.), and containing 200 mg. of the carbamate. The tablets are coated with a thin layer of shellac, dissolved in ethanol, and thereafter sugar coated in the usual manner.

Example XVII.—Suppositories

A solution is made by heating to about 40° C. of

| | G. |
|---|---|
| 3-methyl-3-pentanol-carbamate | 20 |
| Polyethylene glycol (average mol. wt. 600) | 17 |
| Polyethylene glycol (average mol. wt. 1000) | 33 | and the solution is mixed with

| | G. |
|---|---|
| Sorbitan monooleate | 2.7 |
| Polyoxyethylene sorbitan monooleate | 2.7 |
| Hydrogenated coconut oil (melted) | 223 |
| Water | 1.6 |

The mixture is poured into molds, giving suppositories weighing 3 g. and containing 200 mg. of the carbamate.

Example XVIII.—Elixir

Mixture 10 mg./ml. A vehicle solution is prepared by heating of

| | G. |
|---|---|
| Sodium carboxymethylcellulose | 7 |
| Sorbitol solution (N.F.X.) | 775 |
| Sodium cyclamate | 8 |
| Methylparaben | 1 |
| Water | 324 |

After cooling to room temperature

| | G. |
|---|---|
| Raspberry flavour | 25 | is added and the vehicle is mixed with

| | G. |
|---|---|
| 3-methyl-3-pentanol-carbamate | 10 |
| Polyoxyethylene sorbitan monooleate | 0.5 | and the mixture is homogenized in a homogenizer yielding an elixir containing 10 mg./ml. of the carbamate. A dosage unit of 15 ml. (1 tablespoon) thus contains 150 mg. of the carbamate.

*Example XIX.—Elixir*

An elixir is prepared containing per liter

| | | |
|---|---|---|
| 3-methyl-3-pentanol-carbamate | g | 20.0 |
| Ethyl alcohol | ml | 150.0 |
| Glycerin | ml | 350.0 |
| Sorbitol (70% solution) | ml | 350.0 |
| Benzoic acid | g | 1.0 |
| Saccharin sodium | g | 0.2 |
| Sucaryl sodium | g | 2.0 |
| Coloring agent (FD & C Red #2) | g | 0.02 |
| Imitation raspberry flavour | ml | 0.2 |
| Spice vanilla | ml | 0.02 |

Distilled water to 1000 ml.

The carbamate is dissolved in about two-thirds of the ethanol and the glycerin and sorbitol are added. The benzoic acid and flavors are dissolved in the balance of the alcohol and combined with the first solution. The saccharin and Sucaryl are dissolved in a small amount of the water and the coloring agent dissolved therein. The aqueous solution is then added to the alcohol solution, the balance of the water is added to bring the volume to 1 liter and after mixing and filtering an elixir is obtained containing 20 mg. of the carbamate per ml. A unit dose of 15 ml. (1 tablespoon) thus contains 300 mg. of the carbamate.

*Example XX.—Capsules*

A mixture is prepared containing equal parts by weight of 3-methyl-3-pentanol-carbamate and lactose. This mixture is then filled 400 mg. per capsule into standard clear gelatin capsules and after closing, the capsules are preferably dusted with talc or cornstarch. The resulting capsules contain per dosage unit 200 mg. of the carbamate.

In the foregoing Examples XV to XX it will be understood that 3-ethyl-3-pentanol-carbamate or 2-methyl-2-pentanol-carbamate can be substituted for the 3-methyl-3-pentanol-carbamate as active component, and that the amounts of active component can be suitably varied within the range of 50 to 800 mg., and preferably 100 to 400 mg. per dosage unit.

Various changes and modifications in the procedures for preparing lower alkyl substituted tertiary pentanol carbamates and incorporating the same in therapeutic compositions will occur to those skilled in the art, and to the extent that such changes and modifications are embraced by the appended claims, it is to be understood that they constitute part of our invention.

We claim:

1. A therapeutic composition comprising as an active muscle relaxing and tranquilizing agent 3-methyl-3-pentanol carbamate in a pharmaceutical carrier, said carbamate being present in the amount of about 50 to 800 mg. per unit dose of said composition.

2. A therapeutic composition as defined in claim 1, wherein said carrier is an orally administrable carrier.

3. A therapeutic composition as defined in claim 1, wherein said carrier is a rectally administrable carrier.

4. A therapeutic composition comprising as an active muscle relaxing and tranquilizing agent 3-methyl-3-pentanol-carbamate in a pharmaceutical carrier, said carbamate being present in the amount of about 100 to 400 mg. per unit dose of said composition.

References Cited in the file of this patent

UNITED STATES PATENTS

| | | |
|---|---|---|
| 1,016,977 | Thron et al. | Feb. 13, 1912 |
| 2,791,602 | Bavley et al. | May 7, 1957 |
| 2,814,637 | Marshall et al. | Nov. 26, 1957 |
| 2,816,910 | Junkmann et al. | Dec. 17, 1957 |

FOREIGN PATENTS

| | | |
|---|---|---|
| 245,472 | Germany | Dec. 3, 1912 |

OTHER REFERENCES

Spielman et al.: J.A.C.S., vol. 72, 2520–22 (1950).